Oct. 19, 1954 G. J. DURNDELL 2,691,975
MEANS FOR FORMING GRINDING WHEELS
Filed May 5, 1952 3 Sheets-Sheet 1
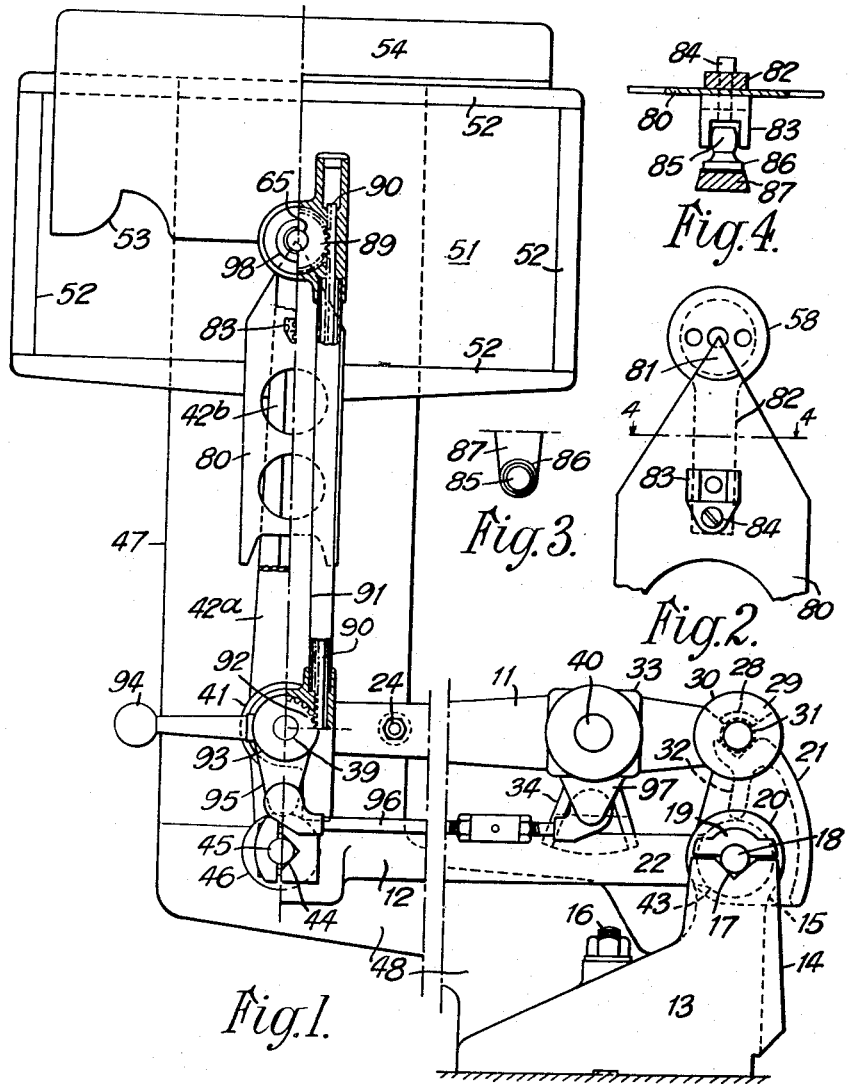
INVENTOR
George J. Durndell
By Shoemaker Mattare
ATTORNEYS

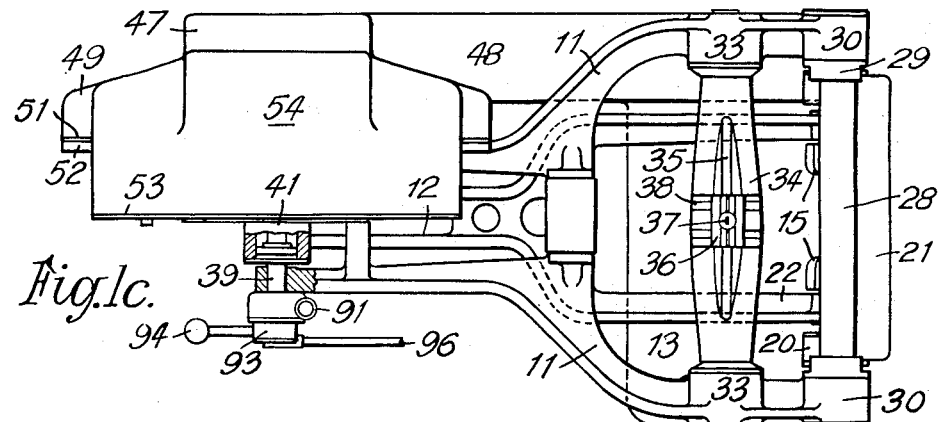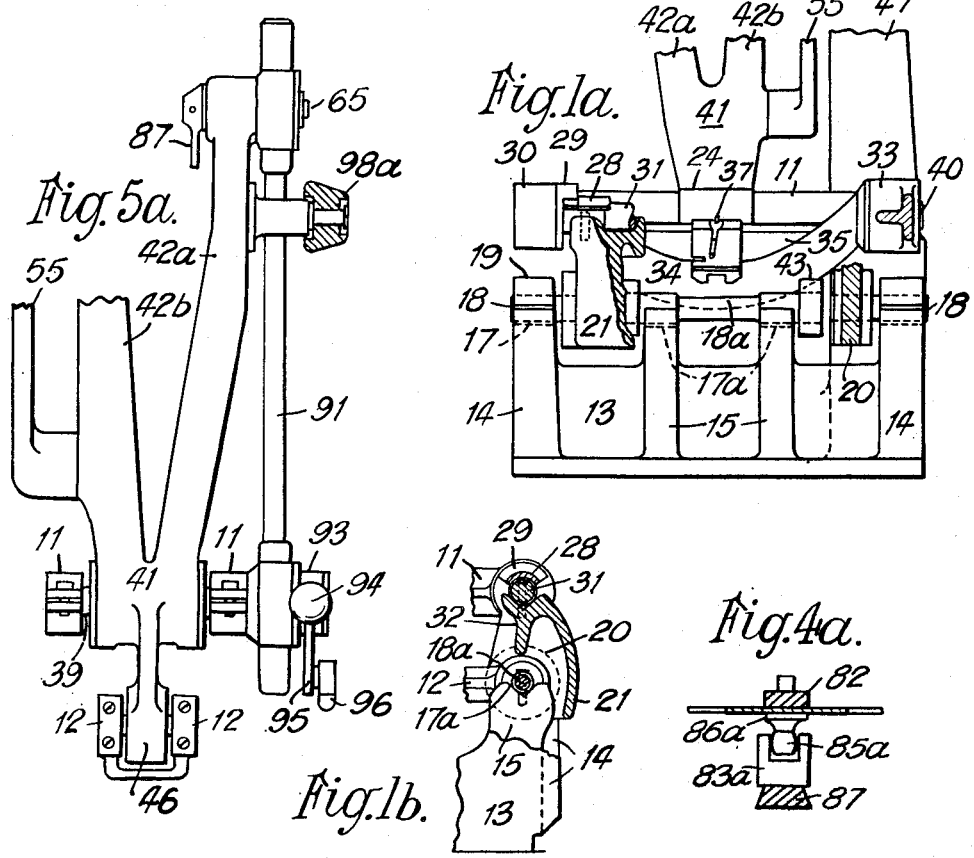

Oct. 19, 1954   G. J. DURNDELL   2,691,975
MEANS FOR FORMING GRINDING WHEELS
Filed May 5, 1952   3 Sheets-Sheet 3
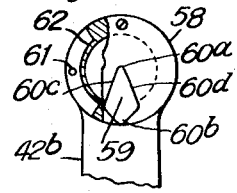
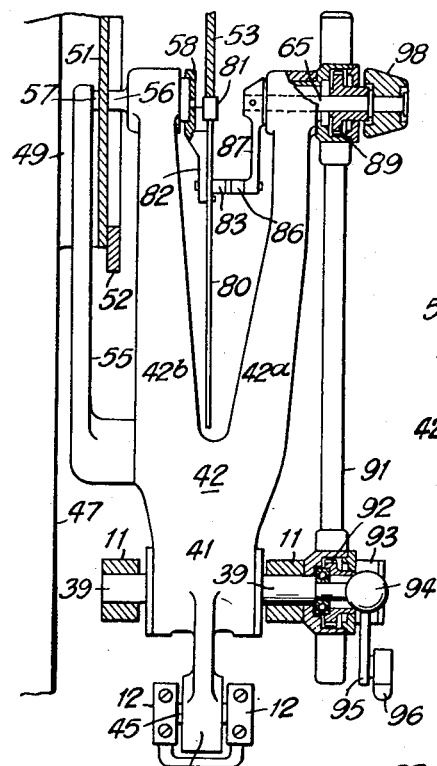
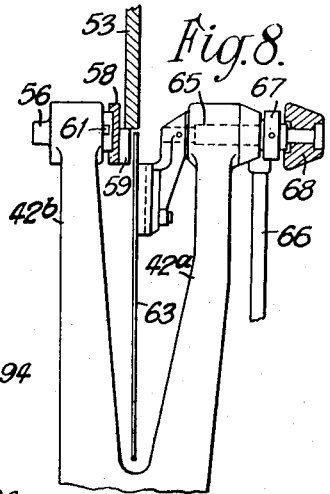
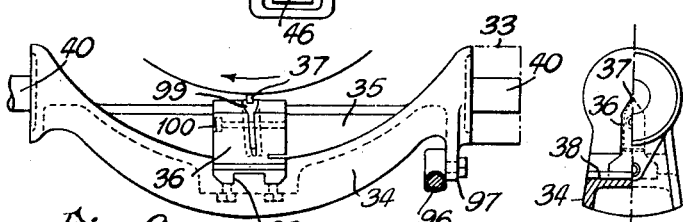
INVENTOR
George J. Durndell
By Shoemaker & Mattare
ATTORNEYS Patented Oct. 19, 1954

2,691,975

UNITED STATES PATENT OFFICE 2,691,975

MEANS FOR FORMING GRINDING WHEELS

George Jasper Durndell, Ruislip, England, assignor to Durndell True-Path Limited, Slough, England, a British joint-stock company Application May 5, 1952, Serial No. 286,119

Claims priority, application Great Britain May 11, 1951

7 Claims. (Cl. 125—11)

This invention relates to means for forming grinding wheels and like rotatable devices, for the purpose of shaping the periphery by cutting with a diamond or other tool in order to generate a desired profile, the formed wheel being then used for grinding work-pieces to a shape which is the converse or complement of the profile of the wheel.

The preliminary formation of the wheel and its trueing up after use are commonly effected by cutting the rotating wheel with a diamond-tipped tool, operated by means of a hand-controlled pantograph mechanism which causes the tool to copy on a reduced scale the movement of a stylus or tracer guided by hand along the edge of a template representing an enlarged version of the desired profile.

The invention has for its main object to improve the accuracy of the pantograph mechanism as the stylus or tracer follows the varying contour of the template while the forming tool operates to cut the periphery of the wheel to the corresponding profile.

Another object of the invention is to provide improved means for controlling the rotary motion of the stylus or tracer and the resulting angular adjustment of the tool so as to avoid displacement of the tracer due to varying degrees of hand-pressure upon the rotation means.

A further object of the invention is to dissociate the rotation means of the stylus or tracer from the traverse means for guiding it along the edge of the template, said rotation means being preferably mounted coaxially with one of the pivotal connections of the pantograph mechanism.

Other objects and advantages of the invention will hereinafter appear from the following description, given with reference to the accompanying drawings, in which:

Fig. 1 is a front elevation of the apparatus in a preferred embodiment;

Figs. 2, 3 and 4 are details thereof on an enlarged scale, Fig. 4 being a section on the plane 4—4 of Figs. 2 and 3;

Fig. 5 is a partial side view of the apparatus as seen from the left of Fig. 1;

Fig. 1a is a partial side view of Fig. 1, seen from the right;

Fig. 1b is a detail of Fig. 1, partly broken away;

Fig. 1c is a plan view of the lower part of the pantograph mechanism seen in Fig. 1;

Fig. 4a is a detail corresponding to Fig. 4 and showing a modification;

Fig. 5a is a partial side view corresponding to Fig. 5 and showing modifications thereof;

Fig. 6 is an elevation of the tool-holder detached from the pantograph mechanism;

Fig. 7 is an end view of the tool-holder, one half being shown in section at the position of the tool;

Fig. 8 is a partial side view, similar to Fig. 5, of a modification; and

Fig. 9 is a detail thereof.

In the embodiment of the invention illustrated in Figs. 1 to 5, the main lever arm 11 of the pantograph mechanism and the parallel lever arm 12 extend substantially horizontally above a suitable holding fixture 13 having two pairs of lugs 14, 15 integral therewith and spaced along one edge, as shown in Fig. 1a; the fixture may be supported for example upon the table of a grinding machine by means of bolts 16. The fixed pivot of the pantograph is formed by three co-axial pins 18, 18a and 18, mounted upon the lugs 14, 15. Each lug 14 of the outer pair has a V-shaped notch 17 in which a pivot pin 18 is clamped by a cap 19 secured by screws; the two pivot pins 18 project from the adjacent faces of the lugs 14 and are engaged in pre-loaded ball bearings housed in the vertical cheeks 20 of a short-link connection 21 to the main lever arm 11. Each lug 15 of the inner pair has a similar V-shaped notch 17a, accurately aligned with the notches 17 of the lugs 14, and receiving the middle fixed pivot pin 18a held rigidly in place by screws; the extremities of this pivot pin extend beyond the lugs 15 and are engaged in ball bearings housed in the fork ends 22 of the lever arm 12.

The main lever arm 11, as seen in Fig. 1c, is composed of two similar halves which are cranked outwardly at about the middle of their length; the two halves are secured together by yokes and screws 24 towards the narrow end of the arm, and by an arcuate-section strut 28 at the wider end, this strut being formed with extremital flanges 29 secured as by screws to bearing bosses 30 at the end of the lever arm. These bosses enclose pre-loaded ball bearings engaged by the extremities of a spindle 31 secured in V-shaped notches at the upper end of the link connection 21, which has an outwardly curved main portion integral with the two cheeks 20, as well as a stiffening web 32 extending between the cheeks.

Another pair of bearing bosses 33 formed in the halves of the lever arm 11, at a convenient distance from the extremital bosses 30, as seen in Fig. 1c, enclose pre-loaded ball bearings receiving the extremital spigots 40 of a tool-holder 34 which forms a rotatable cross-bar extending between the splayed-out portions of the lever arm, its axis of rotation being parallel to the pivots of the short-link connection 21. This toolholder is curved or outswept between its extremities, as seen in Fig. 6, its middle portion being provided upon its concave side with a rib 35 of V-section, which is gapped centrally to admit a locating block 36 upon which the diamond or like tool 37 is fixed; the block 36 may be slidable upon dovetail ways 38 at the bottom of the gap, the position of which is such that the point of the tool 37 lies accurately in the central plane of the lever arm 11, the axis of rotation of the tool-holder being tangential to the periphery of the wheel at the actual cutting point.

At the narrow end of the lever arm 11, as seen in Figs. 1c and 5 a pivot pin 39 is secured by clamping screws; this pin is engaged by a ball bearing housed in a boss 41 upon the long pantograph link 42 which extends upwards to carry the stylus or tracer.

The other lever arm 12, arranged symmetrically beneath and parallel to the main lever arm 11, is also forked out towards one end, but its maximum width is less than that of the lever arm 11, as seen in Fig. 1c, two spaces being thus provided between them for the two cheeks 20 of the connection 21 which extends for approximately the full width of the main lever arm 11 and stands parallel to the tool-holder 34. The fork ends 22 of the lever arm 12 are formed with two bearing bosses 43 which house the bearings for the extremities of the middle fixed pantograph pivot pin 18a. At the narrow end of the lever arm 12, its sides are formed with V-shaped notches 44, as seen in Fig. 1, in which a pivot pin 45 is rigidly secured by cap-pieces secured by screws; this pin 45 is engaged centrally by a pre-loaded ball bearing housed in a boss 46 at the lower end of the long pantograph link 42.

In the position shown in Figs. 1 and 5, this long link 42 extends vertically in front of a standard 47 secured upon a bracket 48 projecting laterally from one end of the fixture 13. The standard 47 terminates in a substantially rectangular frame 49, to the top and side edges of which there is attached by means of screws a vertical pressure plate 51 of rectangular shape; upon the front face and close to the edges of this plate, there are mounted four strips 52 defining a rectangular recess of such size as to limit the travel of the link 42. An exchangeable template 53 is suspended vertically from a bracket 54 secured on top of the frame 49, this template being located at a convenient distance in front of the pressure plate 51 so as to be substantially in the vertical plane at the center of the lever arms 11, 12, and therefore in the same plane as the cutting point of the tool 37.

The upper portion of the link 42 is made of V-shape, as viewed in Fig. 5, one branch 42a passing in front of the template 53 and the other 42b passing between the latter and the pressure plate 51; in addition it has an auxiliary arm 55 rigidly secured to the back of the second branch 42b, this arm penetrating behind the plate 51 into the space inside the frame 49. Each of the parts 42a, 42b carries a horizontal pin, the two pins 56, 57 respectively making contact with the front and back of the pressure plate 51, thereby substantially preventing movement of the link 42 in a direction at right angles to its designed plane of motion. The pin 56, which may be fitted with a rubber bush for this purpose, also engages with the strips 52 fitted to the edges of the pressure plate, so as to limit the travel within the rectangular recess defined by these strips; the pins 56, 57 are preferably coaxial with the stylus or tracer carried at the top of the link 42.

As shown in Fig. 5, the tracer comprises an exchangeable disc 58, spigot-located and rotatably mounted, preferably upon pre-loaded ball bearings, at the top end of the part 42b of the long pantograph link, the axis of this disc being in line with the two pins 56, 57; the outer face of the disc moves close behind the template 53 and it carries a metal plate 80 substantially similar in shape to the tool 37 and its locating block, but of larger size according to the ratio of the pantograph mechanism. The metal plate 80 is provided with a working tip 81, made of tungsten carbide or the like, fitted upon a wedge projecting from the face of the disc 58, the tip 81 having a thickness greater than the plate 80, as seen in Fig. 5. The tracer plate 80 is preferably secured to a crank arm 82 extending from the disc 58 in a radial and downward direction; the traced tip 81 will be rounded or otherwise shaped to agree with the forming tool 37, according to the ratio of the pantograph mechanism, but it may have a slightly greater angle so that the rotational movement of the tracer will not expose the flanks of the tool 37 to the grinding wheel being formed, the plate 80 thus acting as a tool-position indicator and having a length sufficient to prevent interference of the grinding wheel with the tool-shank and its locating block or support upon the tool-holder 34.

A coupling fork 83, extending from the face of the plate 80, for example 1½ inches below the tip 81, is secured in place by one or more screws 84 engaging with the crank arm 82, as seen more clearly in Fig. 2; between the parallel arms of this fork, there can engage the part-spherical end-portion 85 of a crankpin 86 secured in a crank 87, as seen in Fig. 3, the engaged position of the parts being shown in Fig. 4. As seen in Fig. 5, the crank 87 is secured upon a spindle 65 rotatably mounted at the top end of the front branch 42a of the long pantograph link; this spindle 65 is connected to the tool-holder 34 by linkage or equivalent means whereby any rotary movement imparted to the tracer from the spindle 65 by way of the cranks 82, 87 and the intermediate coupling means, will be transmitted through the linkage to the tool-holder, as required.

The linkage here shown comprises a pinion 89 keyed on the spindle 65, a slidable rack bar 90 guided in a tubular housing 91 extending parallel to the center line of the link 42, and another pinion 92 mounted coaxially with the pivot pin 39, the two pinions being of equal diameter; the pinion 92 is secured to a rotatable member 93 fitted with a handle 94 whereby the spindle 65 may be rotated by means of the rack and pinion connection or linkage. The rotatable member 93 is provided with a dependent crank arm 95 connected by a link 96 to another crank arm 97 integral with the tool-holder 34, these two crank arms being of equal length and set parallel to one another; thus any rotation of the member 93 to rotate the spindle 65 will be transmitted to the toolholder, a turn-buckle or like adjusting device being provided in the length of the link 96 so that the angular positions of the tool and tracer can be matched accurately.

It will be understood that other forms of linkage or equivalent means may be employed for connecting the spindle 65 to the tool-holder 34 under manual control by a handle or the like mounted coaxial with the pivot pin 39; for example, the gearing 89, 90, 92 may be replaced by two crank arms connected together by a substantially vertical link.

The spindle 65 is shown fitted at its front end with a freely-rotatable knob 98, whereby the tracer can be moved bodily for traverse along the edge of the template 53, the tool moving in unison therewith according to the ratio of the pantograph mechanism; thus the operator can control the bodily movement of the tracer along the template by his grasp of the knob 98, while his other hand operates the handle 94 to effect the partial rotation of the tracer, the separate controls of the two motions enabling him to operate with greater precision.

In pantograph apparatus for the same purpose, as hitherto constructed, with the stylus or tracer rotatably mounted in the usual manner and operated directly by hand both for the traverse along the varying contour of the template and for partial rotation so that the tracer maintains proper relation to the form or contour of the template, the tracer will be subjected to varying degrees of hand-pressure; the effect of this pressure upon the pantograph link causes the working tip of the tracer to be displaced, following a more or less circular path of wavy form, the consequence of such displacement being to produce by the tool point a form of the wheel periphery which is other than a true reproduction of the template profile.

In the present invention displacement of the spindle 65 and its housing at the top of the pantograph link part 42a, due to hand-pressure upon the knob 98, will have substantially no effect upon the path followed by the tracer, relative displacement being allowed for by the coupling device formed by the ball-ended pin 86 fitting between the arms of the fork 83. This coupling device may evidently be arranged, as shown in Fig. 4a, with a ball-ended pin 85a, 86a, extending from the face of the tracer plate 80, the crank arm 87 being slotted or forked as at 83a and the ball-end of the pin fitting into the slot or between the arms of the fork.

The knob 98, which serves only for bodily movement or traverse of the tracer and tool-holder, may be transferred from the spindle 65 to a point lower down the link 42a, for example in the form of a handle 98a located (as shown in Fig. 5a) one or two inches below the spindle 65, where it will be clear of the other moving parts of the mechanism in all working positions.

To reduce still further the distortional influence of the spindle-carrying branch 42a of the link 42 upon the auxiliary branch 42b which carries the tracer, the V-shape of the upper portion of the link 42 may be extended (as illustrated schematically in Fig. 5a) as far down as the bearing boss 41 which houses the pivot pin 39 of the link.

The locating block 36, upon which the tool 37 is fixed, may be widened out at its base, as shown in Fig. 7, to give it a firmer support upon the dovetail ways 38, but its upper portion is preferably of a width not greater than the tool-shank 99. As shown in Figs. 6 and 7, the tool-shank is gripped between the opposite side walls of a cavity within the block 36, by tension of a screw 100 engaged in one of the side walls and having its head accommodated in an external recess on the other side wall, with the middle portion of the length of the screw passing through the shank; the cavity and the tool are preferably inclined at a small angle to give a suitable rake in relation to the grinding wheel to be formed, the direction of rotation of the wheel being indicated by an arrow in Fig. 6. The rib 35 of the tool-holder may be slightly narrower than the locating block 36 which is inserted into the gap between the two end portions of this rib after the tool-shank has been clamped by means of the screw 100.

The separate control of the two motions of the tracer, with the tool-holder performing corresponding bodily and rotational movements, may be applied to a manually controlled tool-position indicator, more particularly in the case of apparatus having a stylus or tracer which adapts itself automatically to the proper angular position while being traversed manually along the edge of the template.

As shown in Figs. 8 and 9, the tracer comprises an exchangeable disc 58 rotatably mounted at the top end of the long pantograph link part 42b; the outer face of the disc moves close behind the template 53 and it carries a follower in the form of a shallow four-sided projection 59 lying symmetrically along a radius of the disc. This projection has four rounded corners, one corner 60a being concentric with the axis of the disc; the radius of this corner is a multiple of the radius of the tool point, according to the ratio of the pantograph mechanism, so that it represents an enlarged copy of the tool profile. The opposite corner 60b may be rounded to any convenient radius, being tangential to the circumference of the disc 58 as well as to the adjacent sides 60c and 60d which are at right angles to one another. The other two sides of the projection, adjacent to the corner 60a, may be made slightly concave so as to ensure that contact with the edge of the template is limited to the rounded corner 60a.

Rotary movement of the disc 58 is limited by a stop pin 61 fixed in the supporting boss of the link part 42b, the disc-locating spigot being formed with a part-circular groove 62 in which the pin is engaged; the angular length of the groove is such that the movement of the disc 58 and its follower or projection 59 is limited to approximately 45° each way in relation to the axis of the pantograph link 42b. The projection 59 normally hangs down with its rounded corner 60a in contact with the template, but it can swing freely in either direction within the limit of 45° each way, whenever the template edge engaged by that corner is inclined to the horizontal. The follower 59 will thus always engage with the template by its corner 60a which corresponds in shape to the point of the cutting tool 37; the thickness of the template is such that the follower 59 only engages with the rear half of the edge. The other half-thickness may be engaged by a tool-position indicator 63, which is a proportional reproduction of the tool; this indicator is similar to the tracer plate 80 already described, but without its working tip 81, the tip of the indicator 63 being preferably rounded off or cut away so as to leave a small clearance beneath the edge of the template, as seen in Fig. 8.

The tool-position indicator 63 is secured to a crank arm 64 fitted upon the spindle 65, in place of the crank 87 for the coupling device above described; the spindle is fitted at its front end with a freely-rotatable knob 68, corresponding to the knob 98 shown in Figs. 1 and 5. Rotation of the spindle may be controlled by any suitable linkage, for example by a rack and pinion device from a rotatable member 93 fitted with a manual control handle 94, as described above, or by means of a link 66 attached to a crank 67 upon the spindle and to a similar crank (not shown) projecting from a rotatable member similar to the member 93 and carrying a handle projecting therefrom.

In this modification, the rotational movement of the tool-holder 34 will be controlled by the linkage as the handle causes the spindle 65 and the arm 64 to turn the tool-position indicator 63, while the tracer disc 58 and projection 59 will be able to rotate independently of the spindle 65, keeping the corner 60a of the projection in contact with the edge of the template. The bodily movement or traverse of the tracer, tool-position indicator and tool-holder will be controlled by the freely-rotatable knob 68 upon the spindle 65, irrespective of the rotational movements produced by the handle of the rotatable member mounted coaxially with the pivot 39 of the pantograph mechanism.

The moving parts of the pantograph mechanism may be balanced by counterweights or by springs of any suitable type, as well known in the art, such balancing means being omitted from the drawings for the sake of simplicity; suitable dust-excluding washers will also be provided to protect the bearings from entrance of abrasive and to retain lubricant.

It will be noted that the template, being suspended in front of the pressure plate 51 and substantially in the central plane of the pantograph lever arms 11, 12, allows the tracer to swing freely without unnecessary restriction, and that the template can be cleaned, removed, exchanged and replaced with great ease.

The invention may be applied not only to the forming of grinding wheels but also to the cutting of any disc-like object the periphery of which can be cut with a diamond, carbide or steel tool, so as to generate a section or profile copied from a template or pattern; the expression "wheel" as employed in the appended claims is therefore to be understood as including any such disc-like object, and the expression "template" is to be understood as including any form of pattern from which a profile or section can be copied.

What I claim is:

1. Wheel-forming means comprising a pantograph mechanism, a holder for a cutting tool adapted to engage a wheel to be formed to a desired profile, said tool-holder being pivotally mounted upon one member of said pantograph mechanism, a fixed support for a template representing the desired profile, a tracer movable bodily in relation to said template-support, said tracer being mounted upon a link of said pantograph mechanism pivotally connected to said tool-holder mounting member of said mechanism, said tracer being thereby interconnected with said tool-holder for simultaneous bodily movements, said tracer-mounting link including two divergent branches rigidly connected to one another, one of said branches carrying said tracer, manual means mounted upon the other of said branches for bodily movement of said tracer in relation to said template-support, and a rotatable member fitted with an external operating handle mounted upon said pantograph mechanism coaxially with the pivotal connection of said tool-holder mounting member to said pantograph link, said operating handle being connected to said tool-holder for angular adjustment thereof.

2. Wheel-forming means comprising a pantograph mechanism, a holder for a cutting tool adapted to engage a wheel to be formed to a desired profile, said tool-holder being pivotally mounted upon one member of said pantograph mechanism, a fixed support for a template representing the desired profile, a tracer movable bodily in relation to said template-support, said tracer being mounted upon a link of said pantograph mechanism pivotally connected to said tool-holder mounting member of said mechanism, said tracer being thereby interconnected with said tool-holder for simultaneous bodily movements, said tracer-mounting link including two divergent branches rigidly connected to one another, one of said branches carrying said tracer, manual means mounted upon the other of said branches for bodily movement of said tracer in relation to said template support, and a rotatable member fitted with an external operating handle mounted upon said pantograph mechanism coaxially with the pivotal connection of said tool-holder mounting member to said pantograph link, said operating handle being connected both to said tool-holder and to said tracer for equal angular adjustments thereof.

3. Wheel-forming means comprising a pantograph mechanism, a holder for a cutting tool adapted to engage a wheel to be formed to a desired profile, said tool-holder being pivotally mounted upon one member of said pantograph mechanism, a fixed support for a template representing the desired profile, a tracer movable bodily in relation to said template-support, said tracer being rotatably mounted upon a link of said pantograph mechanism pivotally connected to said tool-holder mounting member of said mechanism, said tracer being thereby interconnected with said tool-holder for simultaneous bodily movements, said tracer-mounting link including two divergent branches rigidly connected to one another, one of said branches carrying said tracer, manual means mounted upon the other of said branches for bodily movement of said tracer in relation to said template-support, and a rotatable member fitted with an external operating handle mounted upon said pantograph mechanism coaxially with the pivotal connection of said tool-holder mounting member to said pantograph link, said operating handle being connected to said tool-holder for angular adjustment thereof, and means including a rotary coupling device connecting said operating handle to said tracer for transmission of an equal angular adjustment thereto, said coupling device being located between said divergent branches.

4. Wheel-forming means comprising a pantograph mechanism, a holder for a cutting tool adapted to engage a wheel to be formed to a desired profile, said tool-holder being pivotally mounted upon one member of said pantograph mechanism, a fixed support for a template representing the desired profile, a tracer movable bodily in relation to said template-support, said tracer being rotatably mounted upon a link of said pantograph mechanism pivotally connected to said tool-holder mounting member of said mechanism, said tracer being thereby interconnected with said tool-holder for simultaneous bodily movements, said tracer-mounting link including two divergent branches rigidly connected to one another, one of said branches carrying said tracer, manual means mounted upon the other of said branches for bodily movement of said tracer in relation to said template-support, a rotatable member fitted with an external operating handle mounted upon said pantograph mechanism coaxially with the pivotal connection of said tool-holder mounting member to said pantograph link, said operating handle being connected to said tool-holder for angular adjustment thereof, a spindle mounted upon the other branch of said pantograph link coaxially with said tracer and connected to said operating handle, and a coupling device for transmitting pure rotary motion from said spindle to said tracer, said coupling device being located between said divergent branches.

5. Wheel-forming means comprising a pantograph mechanism, a holder for a cutting tool adapted to engage a wheel to be formed to a desired profile, said tool-holder being pivotally mounted upon one member of said pantograph mechanism, a fixed support for a template representing the desired profile, a tracer movable bodily in relation to said template-support, said tracer being rotatably mounted upon a link of said pantograph mechanism and thereby interconnected with said tool-holder for simultaneous bodily movements, said tracer-mounting link including two divergent branches rigidly connected to one another, one of said branches carrying said tracer, manual means mounted upon the other of said branches for bodily movement of said tracer in relation to said template-support, and means connected to said tool-holder for angular adjustment thereof, said last-mentioned means including an operating handle located coaxially with a pivot of said link to the remainder of said pantograph mechanism, a spindle located upon said other branch of said link substantially coaxial with said tracer, linkage connecting said operating handle to said spindle, and a coupling connecting said spindle to said tracer for transmission of pure rotary motion irrespective of axial displacement of said spindle, said coupling device being located between said divergent branches.

6. Wheel-forming means comprising a pantograph mechanism, a holder for a cutting tool adapted to engage a wheel to be formed to a desired profile, said tool-holder being pivotally mounted upon one member of said pantograph mechanism, a fixed support for a template representing the desired profile, a tracer movable bodily in relation to said template-support, said tracer being rotatably mounted upon a link of said pantograph mechanism pivotally connected to said tool-holder mounting member of said mechanism, said tracer being thereby interconnected with said tool-holder for simultaneous bodily movements, said tracer-mounting link including two divergent branches rigidly connected to one another, one of said branches carrying said tracer, manual means mounted upon the other of said branches for bodily movement of said tracer in relation to said template-support, said manual means including a freely-rotatable actuator mounted upon said other branch of said link, and a rotatable member fitted with an external operating handle mounted upon said pantograph mechanism coaxially with the pivotal connection of said tool-holder mounting member to said link, said operating handle being connected to said tool-holder and tracer for angular adjustment thereof, and said actuator being rotatable independently of said angular adjustment.

7. Forming means of the character described, comprising a pantograph mechanism, a holder for a cutting tool, said tool holder being pivotally mounted upon one member of said pantograph mechanism, a support for a template, a tracer movable bodily in relation to said template-support, said tracer being mounted upon a link of said pantograph mechanism pivotally connected to said tool-holder mounting member of said mechanism, said tracer being thereby interconnected with said tool-holder for simultaneous bodily movements, an operating handle projecting externally from a rotatable member mounted upon said pantograph mechanism coaxially with the pivotal connection of said tool-holder mounting member to said link, a spindle rotatably mounted upon said link substantially coaxial with said tracer and connected thereto for equal angular movements, linkage connecting said operating handle to said spindle and to said tool-holder for equal angular movements, and an actuator mounted upon said spindle in freely rotatable relation thereto for bodily movement of said tracer in relation to said template-support.

References Cited in the file of this patent

UNITED STATES PATENTS

| Number | Name | Date |
|---|---|---|
| 1,367,382 | Hanson | Feb. 1, 1921 |
| 2,038,455 | Studer | Apr. 21, 1936 |
| 2,452,509 | Victory | Oct. 26, 1948 |
| 2,469,844 | Porter | May 10, 1949 |

FOREIGN PATENTS

| Number | Country | Date |
|---|---|---|
| 643,240 | Great Britain | Sept. 15, 1950 |